Jan. 2, 1968    L. M. GREENE    3,361,393
INSTRUMENT LANDING SYSTEM FOR AIRPLANES
Filed Dec. 20, 1965
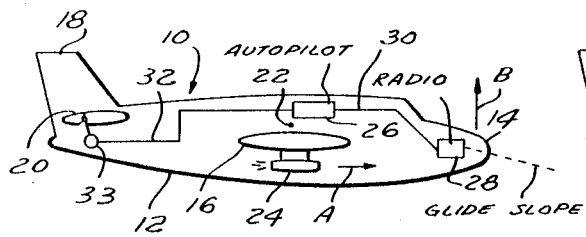
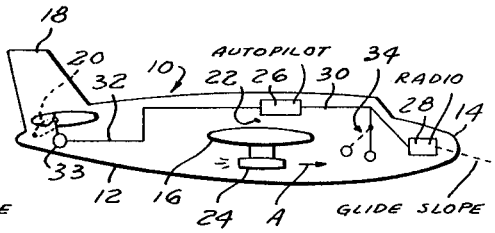
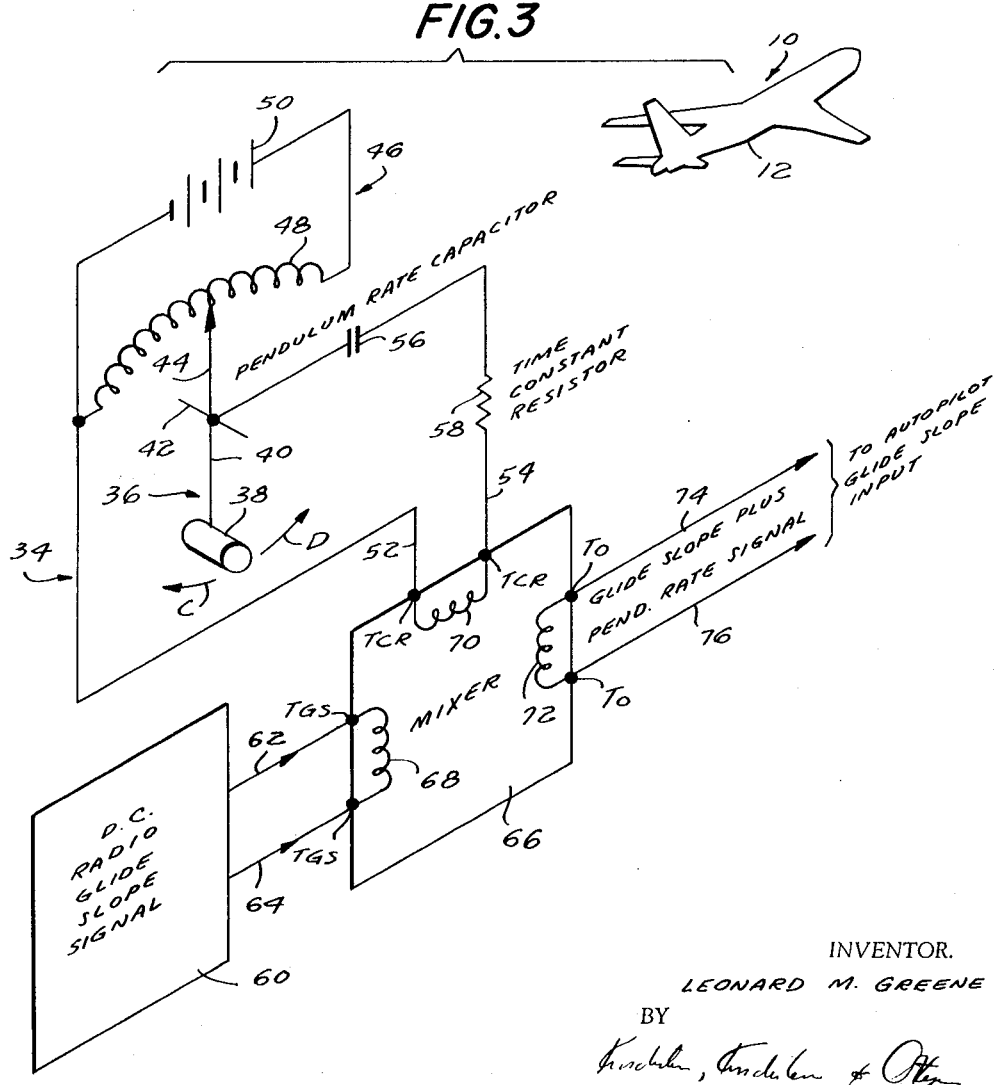
INVENTOR.
LEONARD M. GREENE
BY
ATTORNEYS

United States Patent Office 3,361,393
Patented Jan. 2, 1968

3,361,393
INSTRUMENT LANDING SYSTEM FOR
AIRPLANES
Leonard M. Greene, Chappaqua, N.Y. (% Safe Flight
Instrument Corp., P.O. Box 550, White Plains, N.Y.
10602)
Filed Dec. 20, 1965, Ser. No. 514,987
10 Claims. (Cl. 244—77)

ABSTRACT OF THE DISCLOSURE

An airplane instrument system including a radio controlled autopilot which furnishes a glide slope autopilot output signal that regulates the elevators of the airplane and a compensator for anticipating, and for a short term offsetting, changes in the pitch attitude of the airplane caused by changes in fore and aft engine thrust during landing approach along a glide slope path, the compensator comprising a longitudinal accelerometer that senses change in fore and aft engine thrust, a transducer that supplies an electric signal in response to such sensed change in fore and aft engine thrust, and an electric circuit that decays the signal supplied by the transducer as a function of time with the changed thrust constant and thereby provides a change-in-thrust rate signal which further controls the airplane elevators through the autopilot in a sense opposite to that caused by the change in fore and aft engine thrust.

---

This invention relates to an improvement in an instrument landing system for an airplane. More particularly, my invention is concerned with that improvement in an otherwise conventional instrument landing system which constitutes a novel compensator for anticipating and, for a short term, offsetting changes in the pitch attitude of an airplane caused by engine thrust changes during landing approach.

In a conventional instrument landing system of the character described, landing approaches are effected under the control of an airplane autopilot which is regulated, i.e., in effect, guided, by radio beams. One of these beams is a localizer beam for lateral guidance, that is to say, for guidance on a ground projection plane, so that any deviation of the airplane to the right or to the left of a predetermined ground projection path is sensed, and the error signal fed to the autopilot which manipulates the controls of the airplane in a manner such as to bring the airplane back to the predetermined ground projection path.

The other beam is a glide slope beam for vertical guidance, that is to say, for guidance on a vertical projection plane including the point of touchdown, so that any deviation of the airplane above or below a predetermined vertical plane projection path is sensed and the error signal is fed to the autopilot which manipulates the controls of the airplane so as to bring the airplane back to the predetermined vertical plane projection path.

My present invention concerns the tracking of the glide slope beam by that portion of the autopilot which moves the elevators of the airplane, and, therefore, controls the pitch (pitch attitude) of the airplane. The glide slope signal received by the autopilot is a measure of the height condition of the airplane relative to touchdown, or, phrased differently, is a measure of the height of the airplane at any time relative to a certain point on the predetermined vertical plane projection path (glide slope beam), which point is a function of the ground distance of the airplane from touchdown. Should the airplane be at an improper height during approach, a glide slope error signal of appropriate sense and magnitude is fed to the autopilot which thereupon moves the elevators in an appropriate direction and to an appropriate extent to pitch the airplane in a manner such as to restore the airplane to its proper height relationship along the vertical approach path (the predetermined vertical plan projection path).

A glide slope "low" error signal will cause the autopilot to lift the nose of the airplane. A glide slope "high" error signal will cause the autopilot to lower the nose of the airplane.

There is, however, a serious problem that is caused by the automatic (autopilot controlled) tracking of the glide slope path. This arises when for some reason it is necessary to change the amount of thrust during the landing approach. The change in thrust usually will be engendered by an alteration in the power output of the engine. The change in thrust will alter the pitch of the airplane and thereby upset its equilibrium in tracking the glide slope path. This pitching is caused by an aerodynamic imbalance that arises from the change in engine thrust. For example, if the thrust line of the engine or engines does not coincide with the center of gravity of the airplane, a change in the thrusting force of the engine or engines will develop a couple that results in a change in pitch of the airplane. For instance, if the engine thrust line is below the center of gravity of the airplane, the airplane will pitch up upon experiencing an increase in engine thrust. If the engine thrust line is above the center of gravity of the airplane, the airplane will pitch down upon experiencing an increase in thrust. Moreover, the configuration of the airfoils or even of the fuselage may interact with the engine thrust or the slip stream or jet stream so as to develop a couple that changes with changes in thrust, and said couple will alter the pitch of the airplane.

If a change in engine thrust is required during the final phase of a landing approach and the equilibrium of the airplane is upset by the pitching associated with such change in thrust to the extent that the airplane diverges from the glide slope path, the resultant faulty path of the airplane may cause it to crash. Accordingly, it is important that the pitching effect of the engine thrust change be nullified before it causes errors in the glide path followed by the airplane during landing approach.

It is, therefore, a principal object of my invention to provide a compensator of the character described which provides a transient, i.e., short term, pitch correction to allow the conventional glide slope beam follower portion of an instrument landing system to subsequently and gradually take over the pitch correction.

It is another object of my invention to provide a compensator of the character described which will prevent spurious pitching moments caused by asymmetrical changes in the application of power which upset pitch stability during landing approach and which sometimes are the cause of oscillations so great that a pilot must disconnect the instrument landing system and take over the approach manually or else abort the approach and go around for a fresh landing approach.

Other objects of my invention in part will be obvious and in part will be pointed out hereinafter.

My invention accordingly consists in the features of construction, combinations of elements and arrangements of parts which will be exemplified in the system hereinafter described and of which the scope of application will be indicated in the appended claims.

In the accompanying drawings in which is shown one of the various possible embodiments of my invention.

FIG. 1 is a diagrammatic sketch of an airplane equipped with an autopilot controlled by an instrument landing system and in which the engines are located beneath the center of gravity, said sketch showing the nose-up couple caused by an increase in engine thrust;

FIG. 2 is a view similar to FIG. 1, but showing the said airplane further equipped with my novel compensator and illustrating the manner in which the compensator acts to make the autopilot deflect the elevator down so as to offset the nose-up pitching moment caused by increased engine thrust; and FIG. 3 is a schematic circuit diagram showing my novel compensator integrated into the autopilot elevator control portion of an otherwise conventional instrument landing system.

In general, I carry out my invention by providing a longitudinal acceleration sensitive means carried by the airplane and located to be responsive to changes in engine thrust. In conjunction with said means, I provide a transducer which furnishes an electric output that varies as a function of the thrust sensed by the longitudinal acceleration sensitive means so as to provide an output that varies with the magnitude and sense of a change in engine thrust. Furthermore, my novel compensator includes a rate capacitor, preferably in combination with a time constant resistor, which are connected in series in the output of the transducer so that the output of the capacitor furnishes a correction signal upon a change in engine thrust, which signal decays over a short span of time, determined by the values of the capacitor and resistor, unless a further change of engine thrust is experienced. In this manner my novel compensator supplies an immediate anticipation correction signal when engine thrust is experienced, but this correction signal is transient (short term) and is gradually reduced in a few seconds by which time the glide slope beam follower portions of the autopilot system will have taken over. Still further, in accordance with my invention, the time decayed output of the transducer is fed to a computer, e.g., a mixer, into which there also is fed the radio received glide slope signal, and the combined output of these two signals constitutes the regulating signal fed into the autopilot glide slope input to control the elevators.

Referring now in detail to the drawings, and more particularly to FIG. 1, the reference numeral 10 denotes a conventional airplane having a fuselage 12 with a nose 14. The airplane includes wings 16, a rudder 18 and elevators 20. The reference numeral 22 denotes the location of the center of gravity.

The reference numeral 24 denotes the location of an airplane engine. Only a single engine has been shown, the same representing an average position of all the engines with respect to the center of gravity 22. In the illustrated airplane the engines are below the center of gravity. It will be understood that this is not a necessary relationship. The engines might be located above the center of gravity. Furthermore, the engines might be so located that their conjoint thrust line passes through the center of gravity, but the configuration of the airplane fuselage and wings and the type of engine is such that a change in engine thrust will develop a change in pitching couple. The illustrated arrangement has been selected only because it illustrates clearly a change in pitch couple (pitch moment) consequent upon a change in engine thrust.

The airplane is equipped with an autopilot 26 such as is conventionally employed and with a tracking radio 28. The radio tracks two ground beams, which, as indicated earlier, include a localizer beam and a glide slope beam, and has at least two outputs. Inasmuch as the present invention is solely concerned with control of pitching and following of the glide slope beam, nothing further will be said with respect to the localizer beam or to the section of the radio 28 which senses deviations from said beam.

The operation of the radio which tracks the glide slope beam furnishes a DC glide slope signal which is a function of the deviation of the airplane from the glide slope beam. The DC glide slope signal is fed along a channel 30 to the autopilot, or, more specifically, to the autopilot glide slope input. The autopilot in turn has a glide slope output which is fed along a channel 32 to a servomotor 33 that regulates the position of the elevators 20. As is well-known, if the radio senses a deviation from the glide slope beam, it will generate an error signal depending on whether the airplane is above or below the beam. This error signal is fed to the autopilot which in turn feeds a control signal to the elevator servomotor 33 that alters the setting of the elevators. If the airplane is above the glide slope path, the elevators are deflected downwardly to pitch the airplane nose-down and vice versa.

However, if when the airplane is on (following) the glide slope beam it experiences a change of engine thrust, a couple is developed for which there is no immediate pitch correction furnished by the autopilot because the airplane has still not left the glide slope beam. Hence, an incipient change in pitch is developed for which the standard autopilot system has no offsetting provision. This couple will in a short time cause the pitching to be altered followed by a deviation from the glide slope beam if no anticipatory measures are taken. In FIG. 1 I have, by the arrow A, indicated an increased engine thrust. This takes place while the airplane is on the glide slope beam. In the configuration illustrated, the couple caused by the increased thrust force A is in a counterclockwise sense, as viewed in said figure, and hence, tends to raise the nose up as indicated by the arrow B. If such a change in pitch attitude takes place during landing approach, particularly when the airplane is close to the ground, it may result in a crash. At the least, it will result in spurious pitching and will upset stability. The pitching may be so severe as to engender a phugoid oscillation as the autopilot and instrument landing system hunt to restore the airplane to the glide slope beam. If the pitching or oscillations are of sufficient magnitude, the pilot usually will disconnect the autopilot and will attempt to complete the approach under manual control or simply will refuse to land and will take the airplane around for a fresh approach.

FIG. 2 illustrates the construction of a novel compensator 34 embodying my present invention that will avoid the foregoing difficulties. Said compensator senses the increased engine thrust A and, as a result thereof, injects a correction signal into the channel 30 leading to the autopilot glide slope input. The correction signal is mixed with the glide slope signal coming from the radio 28 and the composite signal is fed to the autopilot which translates it into a control signal that is sent out over the channel 32 to the elevator 20. Because at the time change in engine thrust occurs the airplane is on the glide slope path, the tracking radio 28 will not be generating a signal component calling for a change in elevator position. However, the anticipatory pitch correcting signal injected by the compensator 34 which is such as to cause the autopilot to feed a control signal to the elevator 20, will deflect the elevator downwardly, whereby to offset the thrust pitching moment caused by the increased engine thrust A. This correcting change in elevator position takes place almost immediately following the increased engine thrust, being delayed only by time lags built into a conventional autopilot so that the tendency to change pitch is counteracted before the pitch has had time to change appreciably. However, the correcting signal decays while the increased engine thrust remains at its new high level and the design of the compensator circuit is such that in a few seconds the correcting signal is effectively washed out, so that the elevator autopilot control is again solely regulated by the position of the airplane relative to the glide slope path. Nevertheless, the momentary change in elevator position will have counteracted the pitching couple that arose because of increased engine thrust, so that the pitch attitude of the airplane remains substantially stable.

In FIG. 3, I have shown diagrammatically the physical and electrical components and circuitry of a compensator pursuant to my present invention. The change-of-thrust responsive sensor of the compensator constitutes a longitudinal accelerometer 36 of the inertial type including an inertial mass mounted to be movable in response to changes in engine thrust. Thus, said accelerometer constitutes an inertial mass supported for movement along a path having a substantial component parallel to the direction of thrust of the engines which, with little error, may be taken as parallel to the longitudinal (fore and aft) axis of the airplane. The accelerometer also includes means biasing the inertial mass to a neutral position. One simple form of accelerometer constitutes a weight mounted for translatory movement along a linear path parallel to the longitudinal axis of the airplane together with counteracting springs which bias the mass toward a neutral or idle central position. At any given airplane operating condition the mass will occupy a predetermined position along its path of travel and upon a change in engine thrust, this position will be altered.

Another and particularly simple form of accelerometer is illustrated in FIG. 3, the same constituting a bob (weight) 38 attached to the lower end of a pendulum arm 40 which is mounted to turn about a lateral pivot shaft 42 secured to the fuselage 12 of the airplane 10 in a position perpendicular to the fore and aft axis of the airplane and horizontal when the airplane is in level flight. The biasing means acting upon the bob is the force of gravity. The bob will move rearwardly in the direction C upon an increase in engine thrust and forwardly in the direction D upon a decrease in engine thrust. In the absence of acceleration and in either level flight or when climbing or descending, the bob will hang vertically.

The pendulum shaft 42 controls the location of a tap arm 44 of a potentiometer 46, the resistance winding 48 of which, on which the tap rides, is fast to the fuselage of the airplane. Hence, movement of the pendulum bob, e.g., due to change in engine thrust, will cause a corresponding movement of the tap arm along the resistance winding.

DC potential is applied across the resistance winding 48, the same being supplied, for example from a battery 50.

The output from the compensator 34 constitutes a pair of leads 52, 54. The lead 52 is connected to one terminal of the resistance winding 48. The lead 54 is connected to the tap arm 44. However, series interposed in the branch of the circuit between the output lead 54 and the tap arm 44, are a pendulum rate capacitor 56 and a time constant resistor 58. Hence, the signal appearing across the leads 52, 54, instead of remaining constant at some given voltage output from the potentiometer corresponding to a certain magnitude of acceleration, will, upon a change in engine thrust, experience a sudden rise as the capacitor is charged and then will, with the passage of time, decay to zero as the charge on the capacitor 55 is dissipated across the time constant resistor 58. The values selected for the capacitor and the resistor are such as to produce an RC time constant which is suitable for the autopilot of the airplane equipped with my compensator 34.

It will be apparent that the polarity (sense) of the anticipatory pitch correction signal appearing on the leads 52, 54 is correlated to the effect that a change in engine thrust has on pitch attitude in the particular airplane with which the compensator 34 is to be used. For example, if in a given airplane an increase in engine thrust will cause a nose-up pitch couple, the signal appearing across the leads 52, 54 will be such as to bring about a downward movement of the elevator so as to generate an offsetting nose-down pitch couple. If the effect of the increased engine thrust is the opposite (a nose-down pitch couple), it merely is necessary to reverse the battery 50 or to reverse the direction that its leads 52, 54 inject their signal into the channel 30.

As noted heretofore, a conventional instrument landing system with which the compensator 34 is adapted to be employed includes a glide slope tracking radio 14 having a portion 60 which generates a DC glide slope signal across output leads 62, 64. This signal will be changed upon the airplane assuming a position above or below the glide slope beam at any moment in its landing pattern.

Pursuant to my invention, the compensator output signal appearing on the leads 52, 54 is combined with the DC glide slope signal appearing on the leads 62, 64, to provide a composite signal composed of the radio glide slope signal plus the change-in-thrust rate signal. The combination may be effected in any suitable computer, such, for example, as a mixer 66. As shown herein, the mixer is a summing amplifier such as a reset magnetic amplifier. A typical amplifier of this type is the Ferrac Magnetic Amplifier, manufactured by Airpax Electronics, Seminole Division, Fort Lauderdale, Florida. This type of amplifier includes a plurality of control inputs and a polar output. As illustrated, the amplifier has two input coils 68, 70, each with a pair of input terminals $T_{GS}$ and $T_{CR}$, and an output coil 72 with a pair of output terminals $T_O$. The output terminals are connected to a pair of output leads 74, 76.

In a conventional instrument landing system not utilizing my invention, the lead 62 is connected directly to the lead 74 and the lead 64 is connected directly to the lead 76, the so connected leads constituting the channel 30. However, my compensator injects a signal from the leads 52, 54 into such channel 30 through the medium of the mixer 66. The leads 62, 64 are connected to the terminals $T_{GS}$ and the leads 52, 54 are connected to the terminals $T_{CR}$. Thereby, the composite signal fed along the channel 30 to the glide slope input of the autopilot 26 now includes not only the tracking radio received glide slope signal, but said glide slope signal plus the change-in-thrust rate signal generated by the compensator 34.

With my compensator coupled to the autopilot, should engine thrust be changed during landing approach, an immediate anticipatory pitch correction signal will be fed to the airplane elevators to cause them to assume a position that counteracts the couple brought into being by the change in engine thrust. However, this correcting signal will only last for a few seconds, gradually reducing over this short term period until the signal substantially fades away and thereafter the autopilot is in full control of the elevators unless, of course, there is a further change in engine thrust.

By way of example, five seconds is a suitable RC time constant for the capacitor-resistor combination 56, 58, this being obtained with a capacitor value of 125 mfd., and a resistor value of 40,000 ohms.

It thus will be seen that I have provided a device which achieves the various objects of my invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and useful and desire to secure by Letters Patent:

1. In an airplane instrument system including a radio controlled autopilot in an airplane, which autopilot furnishes a glide slope autopilot output signal that regulates the elevators of the airplane:

(A) a compensator for anticipating and, for a short term, offsetting changes in the pitch attitude of the airplane caused by changes in fore and aft engine thrust during landing approach along a glide slope path, said compensator comprising:

(B) a longitudinal accelerometer for mounting in an airplane to sense change in fore and aft engine thrust, (C) means providing an electric signal in response to change in fore and aft engine thrust sensed by the accelerometer, and (D) means to decay said signal as a function of time and thereby provide a change-in-thrust rate signal for further control of the airplane elevators through the autopilot in a sense opposite to that caused by changes in fore and aft engine thrust.

2. A compensator as set forth in claim 1 in which the longitudinal accelerometer is of the inertial type.

3. A compensator as set forth in claim 1 in which the longitudinal accelerometer comprises a weight, means to guide the weight for movement along a path having a substantial component parallel to the longitudinal axis of the airplane, the weight being biased to a neutral position.

4. A compensator as set forth in claim 1 in which the longitudinal accelerometer comprises a pendulous weight mounted to swing about an axis perpendicular to the longitudinal axis of the airplane and which axis is horizontal when the airplane is in level flight.

5. A compensator as set forth in claim 1 in which the time-decaying means includes a capacitor connected in series in the output of the means providing the electric signal.

6. A compensator as set forth in claim 1 in which the time-decaying means includes an RC series network connected in series in the output of the means providing the electric signal.

7. A compensator as set forth in claim 1 in which the means providing the electric signal includes a source of DC energy and a voltage varying means powered by said source and controlled by the accelerometer.

8. A compensator as set forth in claim 1 which further includes a computer having
(I) terminals for application thereto of a radio glide slope signal and
(II) having further terminals to which the change-in-thrust rate signal is applied,
(III) said computer having output terminals for supplying to an autopilot glide slope input a composite signal composed of the radio glide slope signal plus the change-in-thrust rate signal.

9. A compensator as set forth in claim 8 in which the computer is an electric mixer.

10. A compensator as set forth in claim 8 in which the computer is an electric summing means.

References Cited

UNITED STATES PATENTS 3,295,796    1/1967    Gaylor _____ 244—77

FERGUS S. MIDDLETON, *Primary Examiner.*